July 14, 1936.  M. F. BATES  2,047,186

TEMPERATURE COMPENSATED GYROSCOPE

Filed Oct. 4, 1933

INVENTOR
Mortimer F. Bates
BY Herbert H. Thompson
HIS ATTORNEY.

Patented July 14, 1936

2,047,186

UNITED STATES PATENT OFFICE 2,047,186

TEMPERATURE COMPENSATED GYROSCOPE

Mortimer F. Bates, Brooklyn, N. Y., assignor to Sperry Gyroscope Company, Inc., Brooklyn, N. Y., a corporation of New York Application October 4, 1933, Serial No. 692,115

6 Claims. (Cl. 74—5)

This invention relates to gyroscopic instruments especially adapted for use as indicators or base lines on aircraft, such as the artificial horizon and directional gyroscope, in which great precision is necessary. Such instruments are usually air driven and are made small and as light as possible to save weight. Aircraft instruments, however, are subject to great variations in operating temperatures, especially on military aircraft which ascend to great altitudes. Under the extreme cold experienced at high elevations, great difficulty was experienced with aircraft instruments owing to "freezing" or tightening up of the bearings and disturbing of the delicate balance of the gyroscope in its gimbal bearings showed that trouble was caused by the unequal contraction of the rotor and rotor shaft as compared to the rotor bearing ring or casing due to the fact that the rotor shaft is usually made of hardened steel for its wearing qualities and the rotor ring or casing of aluminum alloy for lightness. Since the coefficient of expansion of the latter is much greater than that of steel it was found that bearings operating satisfactorily under normal temperature conditions would bind at low temperatures. I am aware that attempts have been made to overcome this difficulty by making the bearing ring or casing (or the axially extending parts thereof) and rotor shaft of the same metal or of metals having substantially the same coefficient of expansion. This, however, renders it necessary to employ a composite bearing ring of more complicated structure and greater weight than a simple aluminum alloy ring.

According to my invention, I propose to keep the present standard construction for the rotor shaft and bearing ring, thus allowing unequal expansion and contraction but to compensate for what would otherwise be the binding effect of temperature changes by a specially constructed bearing which maintains a light contact with the rotor shaft at all times under all temperature conditions. My invention obviously may have application to other types of instruments involving rotating parts and bearings therefor, in which wide variations in temperature may cause difficulty.

Referring to the drawing showing the preferred form of my invention;

Figure 1:
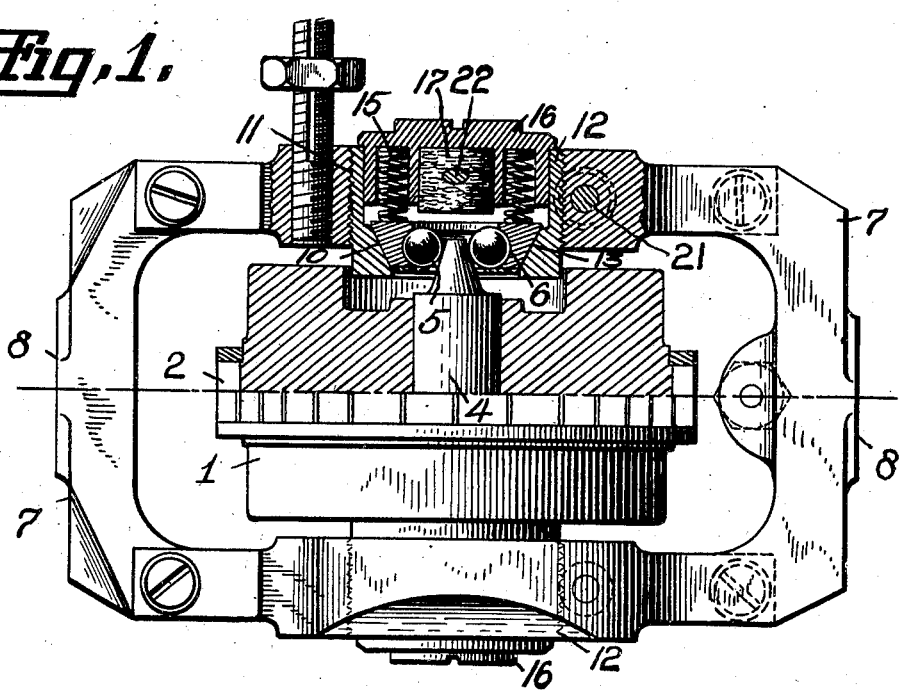
Fig. 1 is a plan view, partly in section, of a gyro rotor and rotor bearing ring with the bearing constructed in accordance with my invention.
Figure 2:
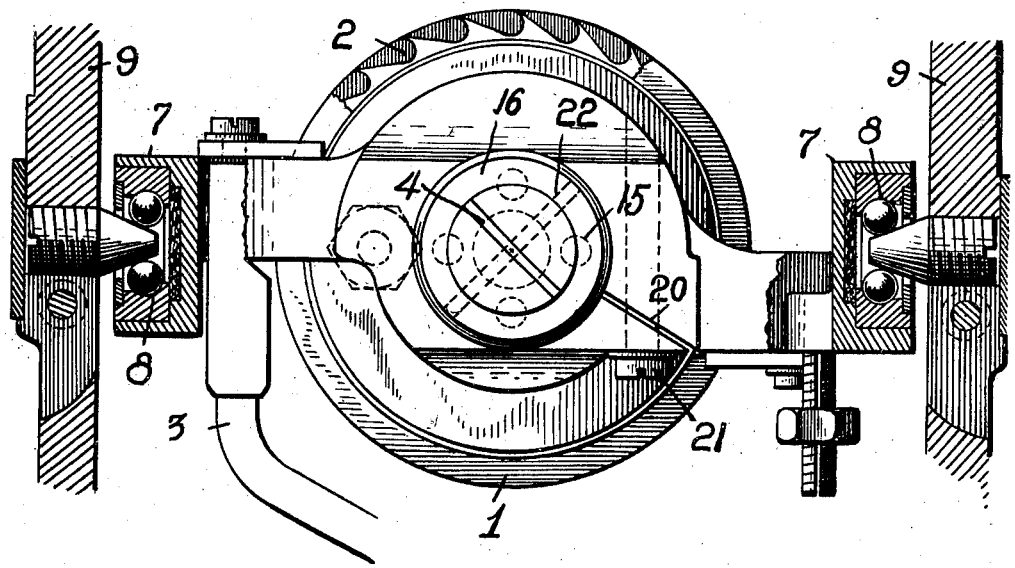
Fig. 2 is an end elevation of the same.

The particular gyroscope selected for illustration is a directional gyroscope in which the rotor 1 may be air driven by means of buckets 2 on the periphery thereof, against which air from an air jet in tube 3 strikes. The rotor is usually made of a heavy metal, such as brass, the rotor shaft 4 being of hardened steel to provide a long life bearing. The shaft is shown as tapered at its ends to engage the balls 5 of anti-friction bearings 6 in the rotor bearing ring 7 thus providing a combined radial and thrust bearing sometimes termed a cup bearing. Obviously the bearing might be placed in the rotor and stub shafts in the ring, if desired, as indicated by the bearings 8 between the vertical ring 9 and the rotor bearing ring 7. The vertical guide bearings for ring 9 are not shown.

The rotor bearing ring or end play or lost-motion causing casing is preferably made of an aluminum alloy for the sake of lightness. To avoid the ill effects of wide temperature changes on the freedom of the bearings, I prefer to make the periphery of the ball race 6 conical or tapered inwardly, as shown at 10. Said race is preferably made of hardened steel which, of course, has a low coefficient of expansion. The rotor bearing ring is provided with a large threaded aperture 11 at each side in each of which is threaded a thimble 12 preferably of aluminum alloy or other light metal having a higher coefficient of expansion than the steel ball race. Said thimble is provided with a complementary tapered opening 13 against which the ball race seats. Also said case is preferably held lightly against its seat by a plurality of compression springs 15 which seat at their inner end against said race and at their outer end in bores in the cap 16. Cap 16 is held in thimble 12 by a pin 22 which is of such length that it clears the seat of the threads on the thimble 16. An oil wick is shown at 17. The whole housing may be tightly locked in place by making a slot 20 in the ring 7 and tightening a screw 21 to clamp the ring tightly against the threaded housing.

The operation of my bearings in compensating for temperature changes is as follows: Assuming that the parts have been adjusted for ordinary temperatures and that the instrument is then subjected to below zero temperature. The ring 7 will contract much faster than the shaft 4, thus tending to draw the bearings inwardly. At the same time, however, the aperture 13 in the thimble 12 will contract more rapidly than the outer periphery of the ball race, thereby tending to push the race outwardly. With the proper temperature coefficients and angle of inclination of the conical surfaces, it will be readily seen that the ball bearings may be held in the same position during wide temperature changes. Furthermore, even if the changes in temperature do cause a certain amount of variation in the position of the balls, no binding or out of balance will be caused thereby since the springs 15 hold the conical surfaces in contact and an equal change will take place in each bearing on the two sides of the gyroscope.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a gyroscopic apparatus for aircraft, the combination with the rotor shaft of a hard metal and a rotor bearing ring of a light metal having a greater coefficient of expansion than said shaft, of a ball bearing between said shaft and ring having a ball race comprising a steel ring within which are confined the balls and the periphery of which is tapered, and a housing for said race of a metal having a greater coefficient of expansion than said race and having a complementary tapered opening to receive said race.

2. In a gyroscopic apparatus for aircraft, the combination with the rotor shaft of a hard metal and a rotor bearing ring of a light metal having a greater coefficient of expansion than said shaft, of a ball bearing between said shaft and ring having a ball race comprising a steel ring within which are confined the balls and the periphery of which is tapered, a housing for said race of a metal having a greater coefficient of expansion than said race and having a complementary tapered opening to receive said race, and yielding means holding said race against its seat.

3. In a gyroscopic indicator, the combination with a rotor and rotor shaft bearing ring having different coefficients of expansion, of a combined radial and thrust bearing for each side of the rotor including a hollow exteriorally tapered freely shiftable member forming the race of the bearing, and a housing for said member having a complementary tapered opening in which said member is seated, the temperature coefficients of expansion of said member and housing being different and such that said member is pushed by the tapered housing in a direction to prevent either binding or lost motion under different temperature conditions.

4. In a gyroscopic indicator, the combination with a rotor shaft and rotor bearing ring having different coefficients of expansion, of a combined radial and thrust bearing for each side of the rotor including a hollow exteriorly tapered member forming one part of the bearing, a housing for said member having a complementary tapered opening in which said member is seated, the coefficients of expansion of said member and housing being different and such that said member is pushed by the tapered housing in a direction to prevent either binding or lost motion under different temperature conditions, and spring means for lightly holding said member within said opening.

5. In gyroscopic apparatus for aircraft, the combination with the rotor shaft of a hard metal and a rotor bearing ring of a light metal having a greater coefficient of expansion than said shaft and said shaft having tapered ends, of combined radial and thrust ball bearings between said shaft and ring, each bearing having an externally tapered steel ball race, the tapering being opposite to the tapering of the adjacent shaft end, and a housing for each of said races of a metal having a greater coefficient of expansion than said race and having a complementary tapered opening to receive said race.

6. In a delicate indicator having a rotor, a steel rotor shaft having tapered ends, and a rotor bearing frame of an aluminum alloy, a combined radial and thrust ball bearing between the end of said shaft and said frame, said bearing having a steel ball race tapered oppositely to the taper of said shaft and an aluminum alloy housing for said race adjustably mounted in said frame and having a complementary tapered opening to receive said race, the coefficients of expansion of said parts and the tapering of said tapered parts being such that binding is prevented under temperature variations without permitting end play between the rotor shaft and its bearing.

MORTIMER F. BATES.